Feb. 10, 1959     T. T. MAGEL     2,873,108
APPARATUS FOR HIGH PURITY METAL RECOVERY
Filed July 23, 1947

Witnesses:
Herbert E. Metcalf
Estill E. Gell

Inventor:
Theodore T. Magel
By: Robert A. Lavender
Attorney

United States Patent Office 2,873,108
Patented Feb. 10, 1959

2,873,108

APPARATUS FOR HIGH PURITY METAL RECOVERY

Theodore T. Magel, Cambridge, Mass., assignor to the United States of America as represented by the United States Atomic Energy Commission Application July 23, 1947, Serial No. 762,840

8 Claims. (Cl. 266—15)

This invention relates to an apparatus for preparing metals of a very high degree of purity in massive form, and particularly to a novel hot-filament continuous-flow method of prepartion of high-purity uranium, plutonium, neptunium and other metals.

The prior hot-filament method of producing pure metals consists broadly of volatilizing a metal compound, such as a metal halide, in the presence of a metal wire filament which is maintained at a temperature above the decomposition temperature of the metal halide but below the melting point of the particular metal, whereby the halide decomposes and the metal is deposited on the filament, the system being static and being maintained under low pressure. This prior system has not been found satisfactory for producing pure massive metals that have an atomic number of 90 or greater, or which are highly reactive at the higher temperatures, especially above their melting points.

Hence, broadly an object of the present invention is to produce a metal, particularly uranium, of extremely high purity in massive form by decomposition of a volatile compound of the metal at a temperature above the melting point of the metal.

Another object is to produce metal of extremely high purity from a source or mass of the impure metal by a novel continuous-flow hot-filament method and apparatus in which a heated surface operates at a temperature above the melting point of the particular metal being prepared and preferably is substantially nonreactive with the metal at temperature above the melting point of the latter.

Another object is to produce metals of extremely high purity from an impure source of the metal by a novel continuous-fow hot-filament method which may be accurately and efficiently controlled.

Figure 1:
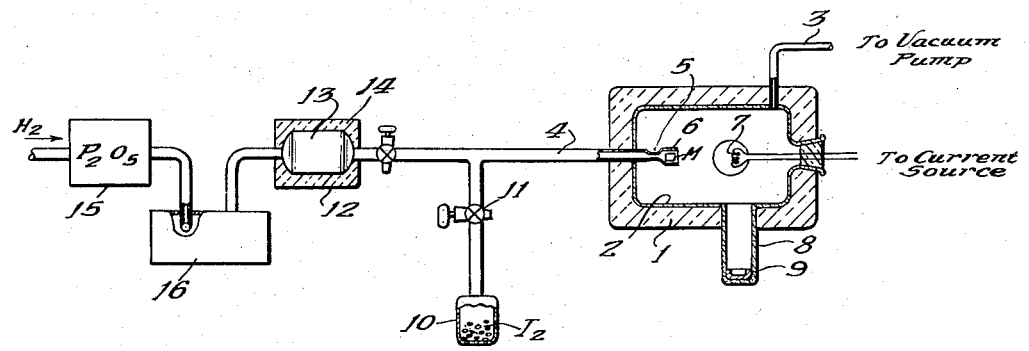
Figure 2:
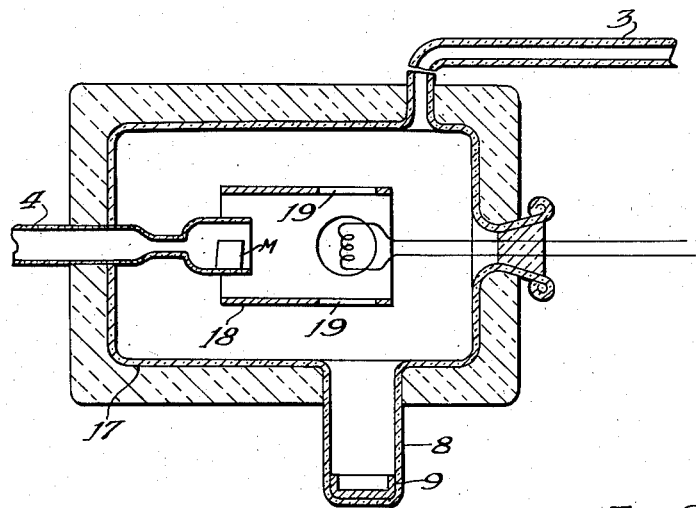

Other objects and advantages will become apparent from the following description wherein reference is made to the accompanying drawings in which:

Fig. 1 is a diagrammatic side elevation, parts being in section, of an apparatus suitable for practicing the present invention; and Fig. 2 is a cross section of a modification of the reaction receptacle of the apparatus illustrated in Fig. 1.

For purpose of illustration, a continuous-flow method and apparatus for the preparation of uranium metal of extremely high purity from an impure mass of uranium metal are disclosed, the broader aspects of the invention and its application to other metals being apparent from the illustrative example and the appended claims.

Broadly speaking, the method comprises volatilizing a metal halide and exposing the halide vapor to a source of heat which is maintained at a temperature above the melting point of the particular metal being prepared so that the metal halide decomposes and the metal is precipitated and falls into a suitable refractory container which is positioned so that the metal, during its fall, cools below a temperature at which it reacts appreciably with the container, and collects in massive form.

In the application to uranium metal, a halogen such as iodine vapor, preferably in the presence of a sweeping gas, such as hydrogen, is passed continuously over an impure mass of uranium metal at very low pressure and in the presence of sufficient heat to cause the production of a uranium iodide vapor which immediately is passed over and is decomposed on a refractory surface, such as a thoria-coated tungsten wire or special carbon filament which is heated to a temperature above the melting point of uranium and is substantially nonreactive with respect to the uranium at said temperature. The pure uranium metal is precipitated on the refractory surface and continuously drips off, falling into a suitable refractory container which is located so that the dripping uranium metal cools sufficiently during its fall to be substantially unreactive with the refractory container when it is received therein. The waste gases are swept out of the system so that equilibrium conditions are prevented and poisons are removed, thereby making the operation continuous.

It is desirable to maintain the pressure in the system very low so as to drive the reaction in the direction of decomposition and precipitation of the metal. By supplying controlled amounts of iodine vapor and hydrogen and maintaining the system at very low pressures, the iodine vapor, which would tend to reverse the reaction if excessive in amount, can be maintained more nearly at the exact amount required. Of these very low pressures, which are usually less than 1 mm. of mercury, a pressure in the system of about 0.10 mm. to as low as $8 \times 10^{-5}$ mm. of mercury has proven most satisfactory.

Referring to Fig. 1 an apparatus which has been found suitable for practicing the above method as a flow or static method is illustrated, it comprises a furnace 1 in which is installed a reaction chamber or receptacle 2, preferably of quartz, near one end of which is an exhaust tube 3 which leads to a vacuum pump of the mercury diffusion type (not shown). Extending into the opposite end of the reaction chamber 2 is an inlet tube 4 having a restricted orifice 5 for producing a jet, and an extension, or support 6, which extends therefrom and is positioned to support a piece or mass of impure uranium metal in alignment with the orifice 5. A filament 7, preferably a wire, is adapted to conduct, and be heated by, electricity, and it is connected to lead wires which extend through the end of chamber 2 that is opposite inlet duct 4. The filament 7 is positioned in alignment with the orifice 5. To facilitate the removal of the filament, its lead wires are mounted in a ground glass stopper capable of a sealed fit with the end of the chamber 2.

The chamber 2 has a dependent well portion 8 arranged to accommodate a refractory receiving container 9 in a position directly beneath the filament 7, the spacing of the receiving container 9 beneath the filament 7 being sufficient to permit molten uranium metal dripping from the filament to cool sufficiently to be substantially nonreactive with the receiving container 9.

For supplying controlled amounts of halogen and sweeping gas into the chamber 2, the inlet tube 4 is connected by one branch to a receptacle 10 from which a halogen, such as iodine vapor, may be introduced under the control of a stopcock 11, and by a second branch to a receptacle 12. In preparing a purer uranium, the sweeping gas introduced into the inlet duct 4 with the halogen is hydrogen which is preferably in a very pure and dry condition and the flow rate of which is controllable. For obtaining a controlled flow of pure dry hydrogen, said second branch of the tube 4 is connected to the outlet of the receptacle 12 in which is a palladium thimble 13. The receptacle 12 is located within a furnace 14 and its inlet is connected to a drying receptacle 15 into which hydrogen may be introduced from a suitable source (not shown), a purifying trap 16, preferably a liquid air trap, being interposed between the drying receptacle 15 and the receptacle 12, if desired. The receptacle 15 contains an agent for drying the sweeping gas used. For hydrogen a suitable agent is $P_2O_5$. The trap 16 is for removal of other impurities and in the apparatus illustrated is a conventional liquid air trap. Control of the flow of hydrogen is effected by heating and cooling of the palladium thimble in the receptacle 12, whereby the quantity of hydrogen adsorbed by the palladium is regulated, additional control being provided by a suitable stopcock interposed between the receptacle 12 and the receptacle 10.

The halogen shown illustratively is iodine vapor and is supplied from a mass of iodine crystals in the receptacle 10, the rate of flow of iodine vapor therefrom being controlled by the temperature and shape of the receptacle 10.

The mixture of iodine vapor and hydrogen in controlled amounts is passed through the orifice 5 and impinges as a jet on the mass M of impure uranium metal on the support 6. At the point of impingement of the jet onto the metal the receptacle 2 is maintained at a temperature at which uranium halide vapor is formed as a result of the reaction of the halogen with the uranium metal. A temperature of from 450–550° C. is satisfactory for this purpose. The uranium iodide vapor thus formed, along with any excess hydrogen and iodine vapor, contacts the filament 7 which is heated to a temperature above the melting point of the uranium, for example, to from 1350° C. to 1500° C. where it is decomposed by the heat. Uranium of a very high degree of purity forms in small globules on the filament 7 as a result of this decomposition and these coalesce into droplets of sufficient size to drip from the filament 7 into the receiving container 9 which is positioned therebeneath so that when the droplets reach the container 9, they have become cooled below a temperature at which the metal reacts appreciably with the container 9. Waste gases and decomposition products are withdrawn from the system through the exhaust tube 3 by the high-capacity vacuum pumps.

Referring to Fig. 2, a reaction chamber 17 is illustrated, this chamber being in all respects the same as chamber 2 except that it is made of Pyrex glass instead of quartz. The use of Pyrex glass instead of the more expensive quartz is made possible by the introduction of a metallic radiation shield 18, such as a tantalum shield, which surrounds the filament in spaced relation thereto and to the walls of the receptacle 17. The shield is provided with apertures 19 so arranged to permit viewing of the filament and to permit the dripping of the metal from the filament into a receiving container 9. The function of the tantalum shield 18 is to prevent aging and deterioration of the glass which would be occasioned by a direct exposure thereof to radiation.

In operation, to provide a continuous flow, the apparatus, which is sealed between the source of hydrogen and the exhaust tube 3, is first flushed with hydrogen and then evacuated. These steps are repeated alternately until the system is thoroughly cleansed and until the furnace and filament have reached the desired temperatures; a satisfactory vacuum is finally established in the chamber 2. The iodine is brought to the desired temperature. The furnace is heated to produce a temperature of 515–520° C. in the reaction chamber 2 at the location of the metal M. The filament temperature is raised to 1350–1500° C. and in the case of uranium to 1450° C. A few experiments will be necessary for determining the temperatures in the case of metals other than uranium.

For contact with uranium, because of its high degree of reactivity at elevated temperatures, a refractory material has to be used that is non reactive with the uranium above the melting point of the latter. A filament found satisfactory for use with uranium is a tungsten wire coated with thoria. A Nernst type filament is particularly good.

The present novel hot-filament continuous-flow method of producing pure metals, therefore, has certain definite advantages among which are that it permits operation above the melting point of the metal being produced, employs to an advantage a refractory-coated filament, uses directly the impure metal as a source instead of iodides or other volatile metal compounds that had to be prepared first, permits very accurate control without danger of contamination, and produces a metal of very high purity.

During operation at least one of the constituents of the high-temperature decomposition or reduction is removed continuously by the sweeping gas and the vacuum pump so that equilibrium is never established and high purity metal is continuously produced at a relatively constant rate.

A number of factors can be varied for effecting control of the operation and for rendering it applicable to metals other than the uranium illustratively described.

Among these factors are the temperature of the metal, filament temperature, pressures, rate of halogen flow, rate of sweeping gas or hydrogen flow, and also the surface characteristics of the impure metal source.

The temperature in the vaporizing portion of the reaction chamber should be maintained high enough to cause rapid and complete reaction of the iodine vapor and metal to produce metal iodide vapor, but at the same time the temperature should be sufficiently low so as not to cause appreciable decomposition of the iodide. In the case of iodine vapor and uranium, the preferred temperature appears to lie between 450° C. and 550° C. for the vaporizing portion of the chamber, though the metal temperature may be slightly higher.

The temperature in the decomposition portion, in this example the filament, should be high enough to reverse the initial reaction. The higher the filament temperature, the greater the tendency of the volatile metal iodide to decompose. For uranium, a filament temperature of 1350° C. appears to be about the minimum temperature for an appreciable reaction rate and operation has been successful at as high a temperature as 1500° C.; about 1450° C. is preferred. The metal iodide decomposes on the heated surface of the coated filament and the purified uranium metal formed deposits thereon. The deposited uranium metal, in turn, provides a surface on which additional uranium iodide is decomposed. Since the surface area of the metal on the filament increases until the metal globules formed drip off, the effective decomposition surface varies periodically within certain limits but maintains itself at a rather constant average for any substantial period of operation.

The rate of iodine flow is proportioned to the state of subdivision of the impure uranium source. Assuming that the surface area of the uranium source is constant, the maximum iodine flow is limited only by the amount of iodine vapor that can react with the uranium. Any excess of iodine above this maximum tends to reverse the reaction at or beyond the filament by combining with metal already precipitated on the filament. Obviously, the iodine flow can be adjusted, and it is increased and decreased in a relationship directly proportional to an increase and decrease, respectively, of the surface area of the metal source.

As mentioned, the rate of flow of iodine vapor is readily controlled by the temperature at which the iodine is maintained, the shape of the receptacle 10 in which the iodine crystals are contained, the degree of low pressure in the system, and the amount of other gas, such as hydrogen, which is introduced.

The flow of hydrogen is controlled by the temperature of the palladium thimble 13 through which the hydrogen is passed before it enters tube 4 and by which it is purified. The sweeping gas used, in one embodiment of the invention, should be one which also reacts with the halogen freed by decomposition of the halide to prevent the freed halogen from recombining with the precipitated metal.

In the case of uranium and iodine vapor, hydrogen appears to operate in this manner. Furthermore the hydrogen may catalyze the formation of uranium iodide at low temperatures by forming uranium hydride, or by forming HI which in turn reacts with the uranium. Again, the hydrogen tends to drive the high temperature reaction in the direction of metal production by combining with excess iodine vapor originally introduced, or formed as a result of decomposition of uranium iodide, and thus causes its immediate removal. Another possibility is an indirect "catalytic effect" such as the removal of "poisons" on the surfaces involved. For example, the hydrogen may maintain the surface film of the impure uranium metal more porous or susceptible to the action of the iodine vapor. Another effect which appears to result from the introduction of hydrogen along with controlled amounts of iodine vapor into a low pressure system is that the amount of iodine vapor which would tend to reverse the reaction at the filament if in excessive amounts can be more nearly maintained at the exact amount required.

Hydrogen is not absolutely necessary for the production of some uranium metal by this invention, but it very greatly increases the yield. It shall be noted that the present invention shall not be limited to a continuous-flow system inasmuch as the method of preparing these metals, such as uranium, may be successfully accomplished by batch operations performed by closing off the reaction system. This method of preparation is satisfactory, although the metal yields are extremely low in comparison to the flow method.

The surface of the filament should be a refractory which is substantially nonreactive with the particular metal being prepared at the temperatures above the melting point of the metal, preferably a refractory inorganic compound, or a nonmetallic filament, such as a filament of the Nernst type should be used. Thoria-, lanthana- and urania-coated filaments of tungsten have proven satisfactory in the case of uranium. Uranium alloys with tungsten, tantalum and other metals and causes filaments to burn out if the latter are exposed to the uranium above its melting point for an appreciable interval. It is desirable that the filament be of as high a degree of purity as practicable.

For other metals, such as plutonium, thorium, cerium, titanium, it is advantageous to use other types of filaments, such as Nernst-type filaments, which are refractory, with 85 percent thoria and 15 percent yttria, and filaments with no metal at all. The filament temperature which will give appreciable yields of the metal desired without reacting with the metal or alloys thereof determines the type preferred in a particular case; it should be borne in mind that the lower the operating temperatures required, the less is the chance for alloy formation so that uncoated metal filaments are useful for some purposes. The receptacle 9 may be of thoria, cerous sulfide, or even platinum.

In a preferred operation in the case of uranium, iodine vapor and hydrogen, the temperature in the reaction chamber is maintained at 515° C. to 520° C., the filament is maintained at a temperature of about 1450° C., the pressure in the system, in mm. of mercury, is maintained at about $8 \times 10^{-5}$ when first evacuated, the introduced iodine vapor is held at about 0.9 mm., the hydrogen pressure is held from about $3 \times 10^{-3}$ to 1 mm., and the ratio of hydrogen to iodine vapor is about 5 to 1.

While the above invention has been described illustratively as applied to uranium, it is applicable to other metals, including tungsten, vanadium, titanium, thorium, hafnium, zirconium, plutonium, neptunium and the rare earths.

In addition to the thoria coating on the tungsten wire, other refractory surfaces may be provided. These include lanthana for tungsten, tantalum nitride for tantalum, and also a properly machined graphite rod is usable; all of these are unreactive with metals at temperatures as high as 1650° C.

For preparing a thoria-coated tungsten filament, a small piece of tungsten wire is spot-welded across the gap between two ordinary pieces of tungsten and then is covered with a thoria-containing slurry either by dipping or by means of a dropper. The slurry coating is dried in air and then the wire is placed in a chamber where it is subjected to a vacuum while the temperature is slowly brought up to 1650° C.; it is maintained at that temperature for a while, the entire procedure requiring from one to two hours. The slurry coating preferably is made as follows: 25 drops of a saturated thorium nitrate solution in water are added to 5 cc. of a very thick thoria paste and sufficient water is added to give the proper consistency. In some instances, where the exclusion of water is desirable, anhydrous materials, e. g. amyl or other alcohol, are used as solvents instead of water.

The lanthana-coated tungsten filament is prepared in the same manner, except for the ingredients. Lanthana itself is extremely hard to dehydrate but a slurry of anhydrous lanthana in ethyl alcohol provides a coating which is suitable after the baking procedure.

Another filament is one of tantalum coated with tantalum nitride obtained by heating a tantalum wire very rapidly to an extremely high temperature in an atmosphere of nitrogen. None of these filaments thus coated reacts with metals deposited on them even at temperatures as high as 1650° C., but the base metals of the filaments would react.

Ordinary carbon filaments have been found unsatisfactory. However, a filament prepared by machining an ordinary preformed graphite rod to a very small cross-section with a portion having a cross-section of less than normal was found satisfactory. The filament is then tapered toward the smallest-diameter portion from a short distance on either side thereof. Such a filament has a section of gradually decreasing cross-section toward the intersection of the tapers and thus of varying resistance. The heat at any given point along the tapered portion of the filament depends directly upon the cross-section.

It shall be noted that other refractories can be used, such as thorium nitride, zirconium nitride, tantalum nitride, uranium nitride, and titanium nitride. These refractories may be applied on the surfaces of a filament such as of tungsten or tantalum. It shall be noted that the present invention shall not be limited to coated filaments, but that non-metallic filaments of the Nernst type having a preferred composition of about 85 percent thoria and about 15 percent yttrium oxide have also been satisfactory.

Specific details of the theory and the essential characteristics of the hot-surface thermal-decomposition method for the preparation of high-purity uranium, plutonium, neptunium and other metals are described and claimed in a co-pending application of Theodore T. Magel, Serial No. 762,839, filed July 23, 1947.

What is claimed is:

1. In an apparatus for the purpose described, the combination of a furnace; gas inlet means connected to said furnace at one side end; a support means connected to and within said furnace a metal-carrying means held by said support means adjacent to said gas inlet means and in the direct path of said entering gas; a body having a non-metallic refractory surface connected to and within said furnace arranged in alignment with said inlet means and said support means; outlet means connected to said furnace at a position to remove gas after contact with said body; a refractory container for receiving molten metal arranged in said furnace at its bottom vertically underneath said body and protruding outwardly from said furnace; and means for heating said body.

2. In an apparatus for the purpose described, the combination of a furnace; gas inlet means connected to said furnace at one side end; a support means connected to and within said furnace a metal-carrying means held by said support means adjacent to said gas inlet means and in the direct path of said entering gas; a filament having a non-metallic refractory surface connected to and within said furnace arranged in alignment with said inlet means and said support means; outlet means connected to said furnace at a position to remove gas after contact with said filament; a refractory container for receiving molten metal arranged at the bottom of said furnace vertically underneath said filament and protruding outwardly from said furnace; and electrical means for heating said filament.

3. In an apparatus for the purpose described, the combination of a furnace; a reaction receptacle in said furnace; gas inlet means connected to said receptacle at one side end; a support means connected to and within said receptacle a metal-carrying means held by said support means adjacent to said gas inlet means and in the direct path of said entering gas; a filament having a non-metallic refractory surface connected to and within said receptacle arranged in alignment with said inlet means and said support means; outlet means connected to said receptacle at a position to remove gas after contact with said filament; electrical means for heating said filament; and a refractory container for receiving molten metal arranged in the bottom of said reaction receptacle vertically underneath said filament and protruding outwardly from said reaction recepeacle and said furnace.

4. In an apparatus for the purpose described, the combination of a furnace; a reaction receptacle in said furnace; gas inlet means connected to said receptacle at one side end; a support means connected to and within said receptacle a metal-carrying means held by said support means adjacent to said gas inlet means and in the direct path of said entering gas; a metal filament having a non-metallic refractory surface connected to and within said receptacle arranged in alignment with said inlet means and said support means; outlet means connected to said furnace at a position to remove gas after contact with said filament; electrical means for heating said filament; a refractory container for receiving molten metal arranged in the botom of said reaction receptacle vertically underneath said filament and protruding outwardly from said reaction receptacle and said furnace; and a refractory metal radiation shield surrounding said filament in spaced relation thereto and to the walls of said receptacle, said shield having openings aligned with said receiving container and said filament.

5. In an apparatus for the purpose described, the combination of a furnace; a reaction receptacle concentrically arranged in said furnace; gas inlet means connected to said receptacle at one side end; a support means connected to and within said receptacle a metal-carrying means held by said support means adjacent to said gas inlet means and in the direct path of said entering gas; a metal filament having a non-metallic refractory surface connected to and within said receptacle arranged in alignment with said inlet means and said support means; outlet means connected to said receptacle at a position to remove gas after contact with said filament; electrical means for heating said filament; a refractory container for receiving molten metal arranged in the bottom of said reaction receptacle vertically underneath said filament and protruding outwardly from said reaction receptacle and said furnace; and a refractory metal radiation shield surrounding said filament in spaced relation thereto and to the walls of said receptacle, said shield having openings aligned with said receiving container and said filament.

6. In an apparatus for the purpose described, the combination of a furnace; a reaction receptacle concentrically arranged in said furnace; gas inlet means connected to said receptacle at one side end; a support means connected to and within said receptacle a metal-carrying means held by said support means adjacent to said gas inlet means and in the direct path of said entering gas; a tungsten filament having its surface coated with thorium oxide connected to and within said receptacle arranged in alignment with said inlet means and said support means; outlet means connected to said receptacle at a position to remove gas after contact with said filament; electrical means for heating said filament; and a refractory container for receiving molten metal arranged in the bottom of said reaction receptacle vertically underneath said filament and protruding outwardly from said reaction receptacle and said furnace.

7. In an apparatus for the purpose described, the combination of a furnace; gas inlet means connected to said furnace at one end; a support means connected to and within said furnace a metal-carrying means held by said support means adjacent to said gas inlet means and in the direct path of said entering gas; a body having a non-metallic refractory surface connected to and within said furnace arranged in alignment with said inlet means and said support means and in substantially horizontal relationship to said support means; outlet means connected to said furnace at a position to remove gas after contact with said body; means for heating said body; and means for supplying a gas to said impure metal through said inlet whereby a decomposable compound is formed and brought to contact with said surface for separating and recovering the metal thereof.

8. In an apparatus for the purpose described, the combination of a furnace; a reaction receptacle concentrically arranged in said furnace; gas inlet means connected to said receptacle at one side end, said inlet means comprising an inlet tube having a restricted orifice whereby a gas jet is formed and a support extension in the path of said jet for carrying a mass of impure metal to be purified; a support means connected to and within said receptacle a metal-carrying means held by said support means adjacent to said gas inlet means and in the direct path of said entering gas; a tungsten filament having its surface coated with thorium oxide connected to and within said receptacle arranged in alignment with said inlet means and said support means; outlet means connected to said receptacle at a position to remove gas after contact with said filament; electrical means for heating said filament; and a refractory container for receiving molten metal arranged in the bottom of said reaction receptacle vertically underneath said filament and protruding outwardly from said reaction receptacle and said furnace.

References Cited in the file of this patent

UNITED STATES PATENTS

| | | |
|---|---|---|
| 553,296 | Aylsworth | Jan. 21, 1896 |
| 1,046,043 | Weintraub | Dec. 3, 1912 |
| 1,306,568 | Weintraub | June 10, 1919 |
| 1,497,417 | Weber | June 10, 1924 |
| 1,568,685 | Moore | Jan. 5, 1926 |
| 2,029,921 | Hansgirg | Feb. 4, 1936 |
| 2,104,073 | Druyvesteyn | Jan. 4, 1938 |
| 2,239,452 | Williams | Apr. 22, 1941 |